(12) United States Patent
Donner (10) Patent No.: US 6,229,658 B1
(45) Date of Patent: May 8, 2001

(54) TWO-AXIS PIVOTING DEVICE (76) Inventor: Wilfried Donner, Kantstrasse 8, D-33615, Bielefeld (DE)

(*) Notice: Subject to any disclaimer, the term of this patent is extended or adjusted under 35 U.S.C. 154(b) by 0 days.

(21) Appl. No.: 09/402,657
(22) PCT Filed: Apr. 14, 1998
(86) PCT No.: PCT/EP98/02152
§ 371 Date: Oct. 8, 1999
§ 102(e) Date: Oct. 8, 1999
(87) PCT Pub. No.: WO98/47034
PCT Pub. Date: Oct. 22, 1998

(30) Foreign Application Priority Data

Apr. 14, 1997 (DE) .............................................. 197 15 451

(51) Int. Cl.⁷ ...................................................... G02B 7/02
(52) U.S. Cl. ............................................ 359/822; 359/819
(58) Field of Search ..................................... 359/822, 819, 359/811, 694, 823; 396/428

(56) References Cited

U.S. PATENT DOCUMENTS 5,847,886 * 12/1998 Spedding et al. ..................... 359/819
5,907,730 * 5/1999 Tseng et al. .......................... 396/428

* cited by examiner

Primary Examiner—Georgia Epps
Assistant Examiner—Timothy Thompson
(74) Attorney, Agent, or Firm—Browdy and Neimark

(57) ABSTRACT

The present invention pertains to a device designed to enable an objective concentrically placed therein to pivot about two mutually perpendicular axis crossing at a point of intersection on the optical axis (X) of the pivoting objective (Y, Z), maintained in an objective holder (OH) which may be pivotably laid into bearings (L1, L2) with two degrees of freedom of a ball surface; said bearings (L1, L2) are mounted against a holding frame (HR) with swivel setting means (KY, KZ) provided thereon, one of which is operatively linked with a meridian sector gear (SZ1, SZ2) and the other with an equatorial sector gear (SZ1, SZ2; SY1, SY2) being torsion-proof driven due to a torsional safety device (FK, FN), each on a circle about a point of intersection on the axis (M), while each equatorial sector gear (SY1, Sy2) may swivel in a pivoting bearing (KK1, KK2) and placed movable into a guide (SA) on a meridian circle on the objective holder (OH).

16 Claims, 6 Drawing Sheets

TWO-AXIS PIVOTING DEVICE

CROSS REFERENCE TO RELATED APPLICATION

The present application is the national stage under 35 U.S.C. 371 of PCT/EP98/02152, filed Apr. 14, 1998.

FIELD OF THE INVENTION

The invention relates to a pivoting device for pivoting a pivoting objective disposed concentrically therein about two pivoting axes that intersect at a right angle in an axis point of intersection in the optical axis of the pivoting objective, the pivoting objective being held in an objective holder, which is seated in bearings so as to pivot in two degrees of freedom of a spherical surface, the bearings being disposed on a stationary holding frame, on which two pivoting-control elements are fixedly held, one of which is operatively connected to a meridian sector gear, while the other is operatively connected to an equatorial sector gear, of the objective holder, the latter being disposed on the objective holder so as to pivot and be displaced in a meridian plane.

BACKGROUND OF THE INVENTION

A pivoting device of this type is known from U.S. Pat. No. 5,502,598 A. The spherical objective holder is seated on its spherical surface. It has a sector-gear drive with a meridian orientation, and an equatorial sector-gear drive, which is oriented orthogonally thereto, and whose sector gear is located on a sphere segment that can pivot about the axis of the equatorial drive, and whose pivoting axis is displaceable in a groove in the sphere segment, the groove lying in a meridian plane. The drive pinion can be conical to complement the sector gear, and the gear shaft is guided in an equatorial groove on the sphere segment. The drive torque of the gear on the sector gear causes the sphere segment to drift in the groove, depending on the direction of the torque, so no unique relationship exists between the meridian and equatorial objective pivoting and the setting rotations of the two drives, which suffices to pan an objective, but is inadequate for a purposeful camera objective setting.

Furthermore, DE 296 096 U1 discloses a camera setting device in which a cylindrical seating is provided at the foot of an objective frame for pivoting the frame about an axis that intersects the objective axis, and a pivotable seating about a vertical axis that intersects with the other pivoting axis in the optical axis is provided on the seated cylinder segment. Because of the large spacing between the pivot bearing and the optical axis, the bellows adjoining the objective standard often interferes with the beam path when the bellows swings out hard; moreover, the bellows is severely mechanically stressed by a buckling that occurs in the process. Avoiding this often requires a new presetting of the entire camera device. These problems are particularly serious in the use of wide-angle objectives.

SUMMARY OF THE INVENTION

It is the object of the invention to improve the pivoting device mentioned at the outset, in which the holder, the attached operating elements for setting the pivoting and the bellows are stationary, and essentially only the pivoting objective is pivoted therein, such that the pivoting is unambiguously associated with the adjustment of the setting elements.

The object is accomplished in that the meridian and equatorial sector gears are guided by an anti-rotation mechanism, which secures them against relative rotation, on a circle, with respect to the holding frame, about the axis point of intersection, and the equatorial sector gear can be pivoted in a pivot bearing and displaceably seated in a guide on a meridian circle on the objective holder for an ecliptic pivoting compensation.

The protection against relative rotation is preferably provided by a guide runner that is secured to the holder, in cooperation with a guide groove cut into the pivot bearing of the sector gear.

The pivot bearing of the sector gear is preferably embodied as a round calotte-shell plate or cap that is preferably seated to rotate about a central axis, preferably in a depression of the objective holder.

For the ecliptic pivoting compensation, the bearing depression in the objective holder extends along a meridian.

In an embodiment of the pivoting device that is especially simple to drive, two equatorial sector gears having associated angular wheels, and two meridian sector gears having associated, further angular wheels are mirror-symmetrical with respect to the axis center point, with the sector gears, which are located opposite one another on the pivoting objective holder, cooperating in pairs and in the same direction to pivot the holder, and the angular wheels being respectively seated on a bearing pin in a bearing housing that is located in the holding frame and has lateral openings; the bearing housing projects with the guide runner, with support and guidance, into the guide groove, which is embodied in one of the associated calotte-shell plates, with the meridian sector gears being embodied in one of the round calotte-shell plates that are only pivotably seated in the objective holder, and with the equatorial sector gears being embodied in one of the round calotte-shell plates that are seated to pivot and be displaced along a meridian in the guide embodied as a pivoting-compensation depression in the objective holder to attain an ecliptic pivoting compensation.

The annular objective holder is advantageously embodied as a sphere segment, and the two annular bearing shells are embodied in a complementary fashion as hollow-sphere segments. The two sphere surfaces lend guidance, support and light blockage to the two nested device parts. To increase the sliding properties of the seating, the two complementary sphere surfaces are advantageously only embodied partially, but overall, such that their mutual guidance is clearly assured by a sufficient number of support points or, better yet, by linear or surface contacting in all pivoting positions.

The sector gears of the pivot drives of the objective holder are advantageously manufactured separately from the holder, and incorporated into calotte-shell plates that are embedded in matching recesses cut into the surface of the objective holder. It is advantageously provided to seat the calotte-shell plate to rotate about its center axis in the one pivoting axis, and to rotate the plate and execute a compensating meridian displacement in the second pivoting axis, which is necessary when a pivoting has already occurred in the first axis, and the further pivoting is to be effected subsequently in the second axis. Depending on the respective pivoting about the first axis according to the type of different equatorial position with respect to the ecliptic, i.e., the stationary pivoting-axis position in the holder, this second axis then has an increasing inclination with respect to the initial position on the inside sphere as the second axis pivots further. Thus, the axis position of the second pivoting axis fixedly disposed in the holder drifts on the meridian on the inside sphere, that is, the objective holder, when a pivoting about both axes is effected.

The design of the calotte-shell segments allows the drive elements to be embedded between them. It is especially advantageous to transmit the drive originating from the setting elements via coaxial adjusting rings to the drive pinions that adjust the sector gears of the objective carrier. The two coaxial adjusting rings are seated to slide one on top of the other in an annular recess in one of the calotte shells, and are provided with rim-gear segments. One of the rim-gear segments comes into contact with the associated adjusting drive, and two oppositely-located rim-gear sectors respectively drive an associated adjusting angular wheel symmetrically relative to the center point of the sphere. The two adjusting rings have rim-gear sectors that are offset from one another and are guided in associated recesses of the calotte shell.

It has proven especially advantageous to arrange the rim-gear sectors that are on the side of the angular wheels at ribs extending perpendicular from the adjusting ring, resulting in an L-shaped profile having a reinforced curvature through a cylinder segment in these sectors.

On the drive side, the further rim-gear sector is mounted to the edge side, and enters an operative connection with a spur gear that is preferably adjustable via an angular gear by means of the setting knob. The entire gear transmission is usefully selected such that one rotation of the setting knob virtually covers the entire pivoting range. Accordingly, a scaling of the setting knob with ±15° is provided, because this is the advisable maximum pivoting range in each axis.

The angular wheels that engage the sector gears of the calotte-shell plates are conical with respect to the center, that is, the axis point of intersection. One part of the angular-wheel toothing meshes with the complementary toothing of the adjusting ring, and on a further part, the angular wheel drives the complementary sector gear of the calotte, thus effecting the pivoting of the calotte-shell segment.

The angular wheels are advantageously seated in small bushings, through which a bearing pin extends. This angular-wheel housing is provided with lateral openings, into which the associated sector gears or sectors of the drive or power take-off extend. The housing of the angular wheel is fixed between the bearing shells, on the one hand, and extends with its inward-oriented end, which is embodied in the manner of a runner, into a guide groove of the associated calotte-shell plate, which supports the sector gear at the edge side. In the holder, the guide runners are respectively held in a fixed orientation with respect to one of the two pivoting directions, and the guide grooves on the calotte-shell plates are accordingly also guided continuously with an orientation in these spatially-fixed, perpendicular, superposed great circles on which the pivoting is effected. These great circles are shifted in a defined manner relative to an objective-holder-related coordinate system because of the ability of the calotte-shell plates to rotate and the meridian displaceability of an oppositely-located pair of calotte-shell plates on the objective holder.

The individual components are preferably manufactured from glass-fiber-reinforced plastic, so-called GFRP, and are given dimensional stability through tempering, or are manufactured through metal investment casting, particularly light-metal investment casting.

BRIEF DESCRIPTION OF THE DRAWINGS

FIGS. 1 through 15 illustrate advantageous embodiments.
FIGS. 15a through d show the angular wheel with the bearing house, in an exploded view and from different sides.

DETAILED DESCRIPTION

Figure 1:
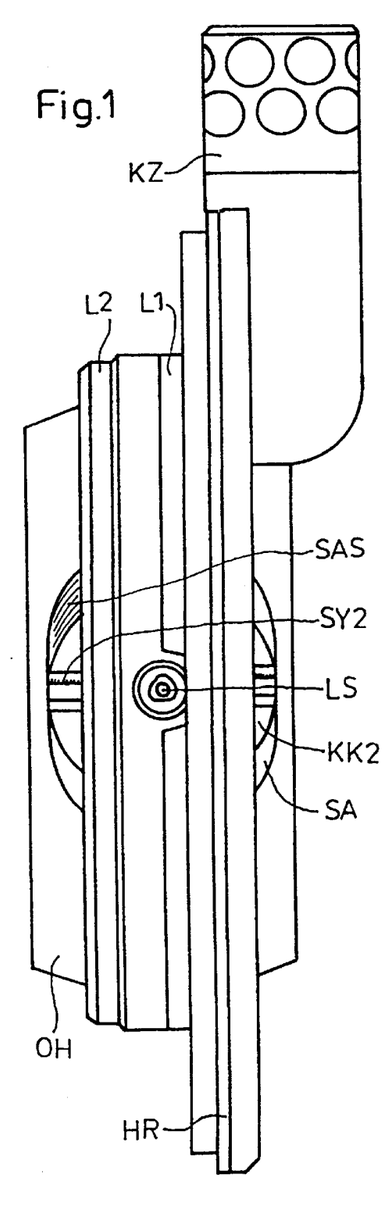
FIG. 1 shows a side view of the device.

FIG. 1 shows the entire device in a side view. The pivoting drive of the Z axis KZ is guided out of the top of the holding frame HR, and ends in a setting knob. Two bearing-shell halves L1, L2, in which the sphere-segment-shaped objective holder OH is seated to pivot in two axes, are disposed in the holding frame HR. A circular calotte-shell plate KK2 is inserted into this sphere, and is held so as to rotate and be displaced in the pivoting-compensation recess SA. The sector gear SY2, which cooperates with an angular wheel for the pivoting process, the wheel being rotatably seated with the bearing pin LS in the calotte shell, is located in the calotte-shell plate KK2. The drift of the calotte-shell plate KK2 in the pivoting-compensation recess SA with a double pivoting of the objective holder OH can be read off of a scale SAS located in the recess SA, and used in a simple manner for a corrective conversion of the degree of pivoting obtained at the setting knob KY with a fixed location reference, relative to a coordinate system on the pivoted sphere surface of the objective holder OH.

Figure 2:
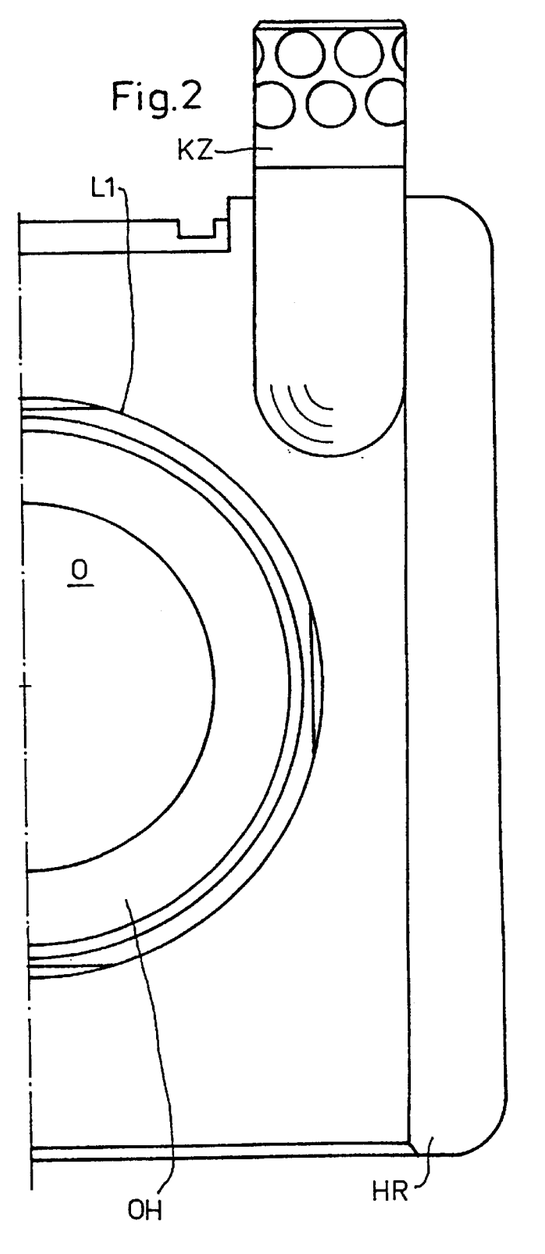
FIG. 2 shows a front view of one half.

FIG. 2 shows a half-view of the front side of the device, with the pivoting-control element KZ for the vertical axis again being visible at the holding frame HR and the objective holder OH for the objective O again being visible in a concentric arrangement in the bearing-shell half L1.

Figure 3:
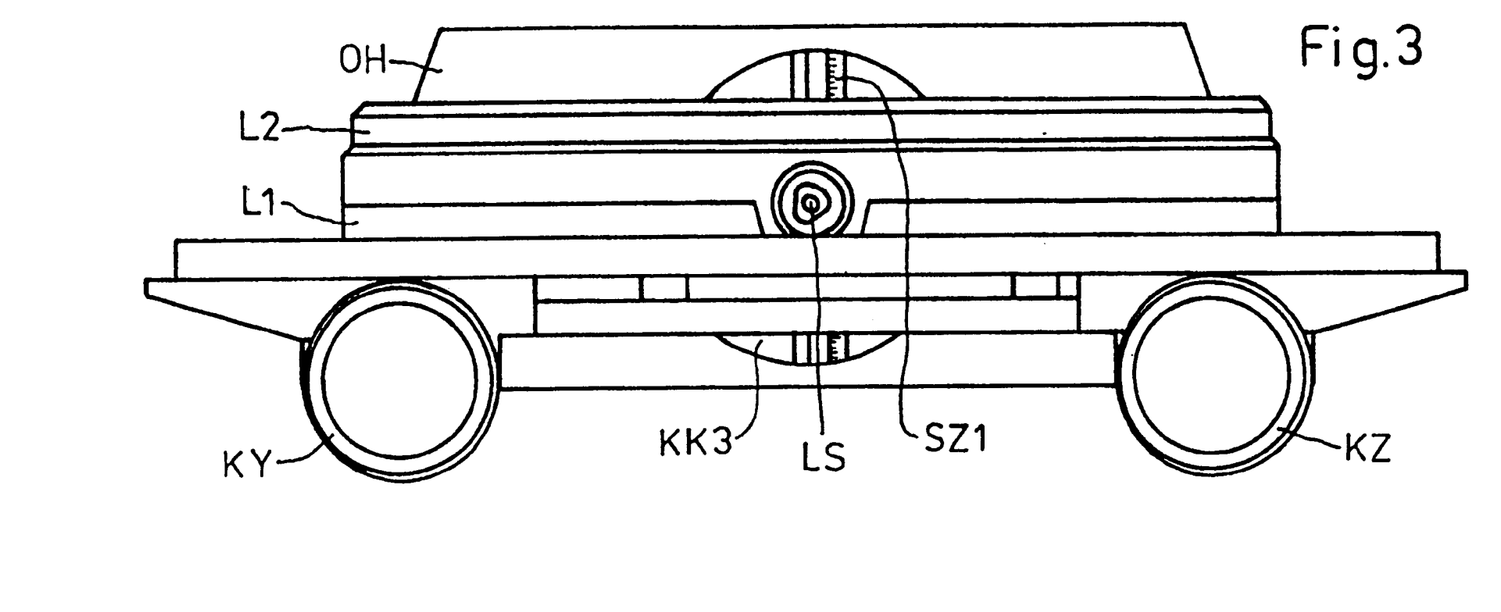
FIG. 3 shows a plan view.

FIG. 3 shows a plan view of the two pivoting-control elements KY, KZ for the two pivoting axes and the upper calotte-shell plate KK3, which supports the sector gear SZ1 for pivoting about the horizontal axis, and is seated in the objective holder OH. Furthermore, the bearing pin LS for the angular wheel and its bearing housing can also be seen, the housing being inserted into the bearing shells L1, L2.

Figure 4:
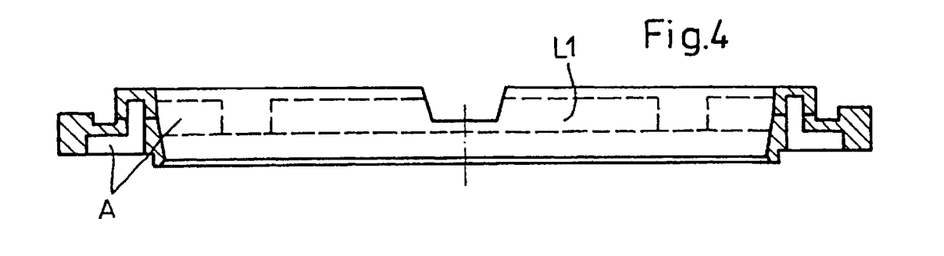
FIG. 4 shows a section of a bearing shell.

FIG. 4 shows a section through the one bearing shell L1, which has a radial recess A that also extends, in sectors, parallel to the axis, as is shown in the dashed lines.

Figure 5:
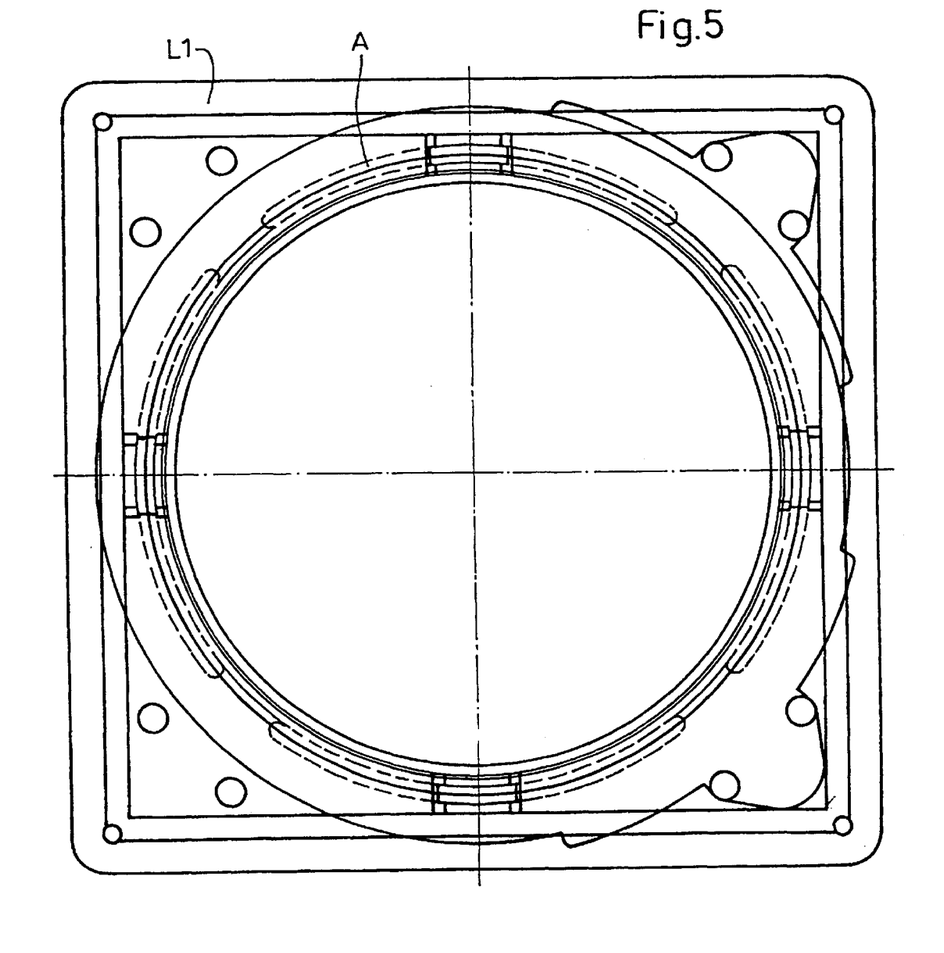
FIG. 5 shows a front view of the same bearing shell.

FIG. 5 shows a plan view of the one bearing shell L1; shown in a dashed line is the recess A, in which the rim-gear segment is displaced during the pivoting when it drives the associated angular wheel. Four bearing recesses are provided for the angular-wheel gears, with two oppositely-located gears corresponding to one another, forming a complementary, symmetrical pivoting drive.

Figure 6:
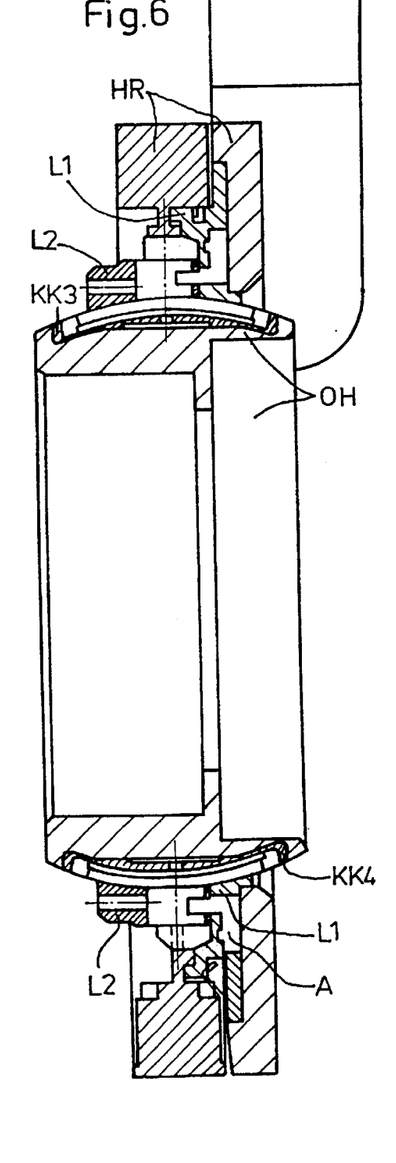
FIG. 6 shows a central section, including some elements, in the vertical direction.

FIG. 6 shows a section through the design of the device in the vertical direction; the angular wheels and adjusting rings are not shown. The inside objective holder OH has a calotte-shell plate KK3, KK4 at the top and bottom, respectively. The objective holder is preferably provided with a bayonet catch for receiving replacement objectives. This entire arrangement is pivotably seated in the two calotte-shell segments L1, L2. The latter are secured in the holding frame HR, which is in turn formed by two frame parts. One of these parts is, for example, the holding frame of an objective standard, which receives the other frame with the entire adjusting device such that the frame and device can be removed.

Figure 7:
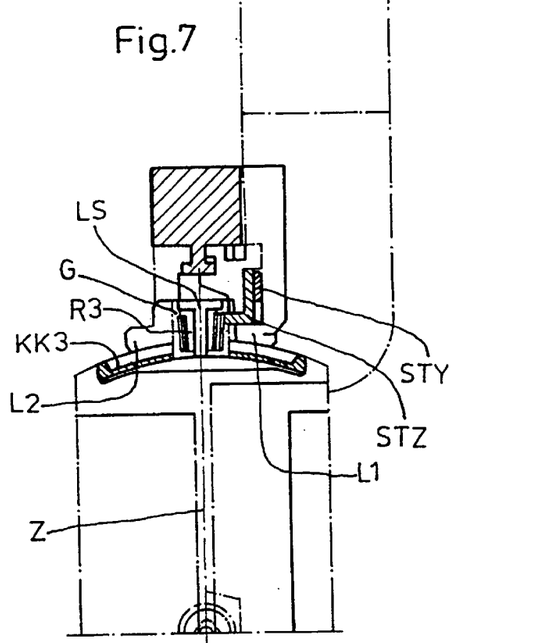
FIG. 7 shows a section through the upper half.

FIG. 7 shows the upper half of the section that includes the drive elements. The two adjusting rings STY, STZ are coaxially seated in the L-shaped pocket of the bearing shell L1 so as to be displaced in a circular path. In the sectional view, the one adjusting ring STZ has an angle side sector that supports an angular-wheel toothing at its face side, the toothing meshing with the angular wheel R3. This angular wheel R3 is inserted into a bearing house G so as to rotate on a bearing pin LS; the housing extends into the calotte-shell plate KK3 and allows the toothing to exit laterally there and engage the segment toothing of the calotte-shell plate on one side. The angular wheel R3 is embodied such that its flanks converge at the center point of the sphere surface of the objective holder. The angular wheel R3 forms an angular gear with the sector gear of the calotte-shell plate KK3 and the toothing of the adjusting ring STZ, respectively.

Figure 8:
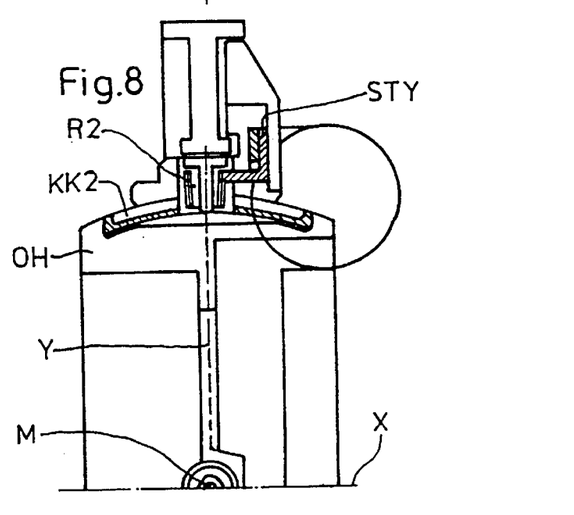
FIG. 8 shows a horizontal section, including some elements.

FIG. 8 shows a horizontal section that includes the gear elements. Here, the second adjusting ring STY is provided with the angled segment extension that supports at its face side the toothing that cooperates with the angular wheel R2. This wheel, with the bearing housing, projects into the calotte-shell plate KK2, which is in turn embedded in the objective holder OH. This drive serves in the pivoting of the Y axis, that is, the horizontal axis, about the center point M, in which the central axis X of the objective holder OH and the vertical axis Z intersect.

Figures 9, 10, 11:
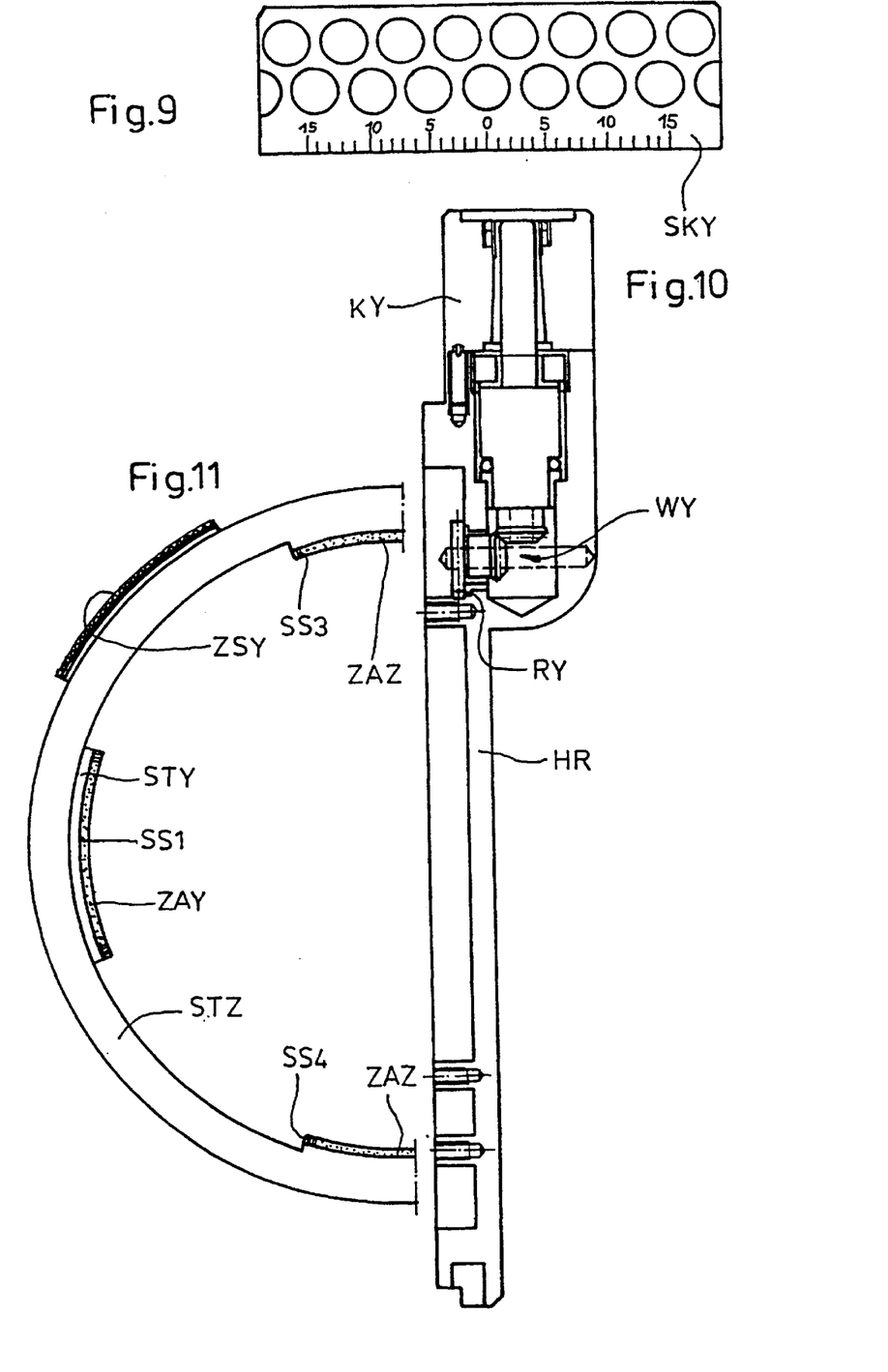
FIG. 9 shows a flattened view of the setting knob.
FIG. 10 shows an axial section through an adjusting drive.
FIG. 11 shows one-half of the two adjusting rings in a plan view.

FIG. 9 shows a flattened view of the setting-knob surface SKY, which bears the grip impressions and, particularly, a scale of ±15°, which corresponds to the angle sides of this drive. From the setting knob KY, a drive shaft leads to an angular gear WY, which is seated in the holding frame HR and drives a gear RY having a toothing at its face side. This gear engages the sector gear ZSY of the adjusting ring STY, which is mostly hidden behind the further adjusting ring STZ in the half-view in FIG. 11. One of the rim-gear segments SS1 is visible at the rim-gear segment ZAY, which protrudes toward the inside. A corresponding rim-gear segment, which is not shown, is preferably disposed opposite this arrangement. The further adjusting ring STZ shown on the front side, with its two rim-gear segments ZAZ and the sector gears SS3, SS4 disposed thereon, can be seen at the top and bottom of the figure. An edge-side driving sector gear is located in the half of the adjusting ring that is not shown.

Figure 12:
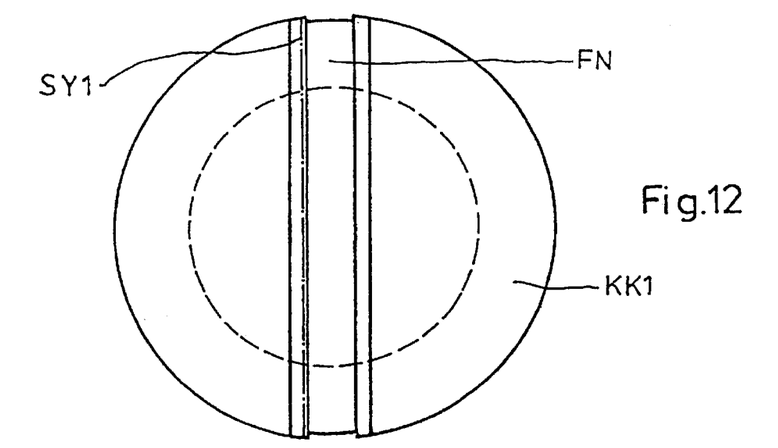
FIG. 12 shows a plan view of a calotte shell.

FIG. 12 shows a plan view of a calotte-shell plate KK1, which has a guide groove FN that extends transversely across it and supports the sector gear SY1 on one side.

Figure 13:
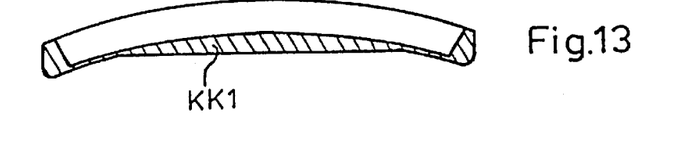
FIG. 13 shows the calotte shell in a longitudinal section.

FIG. 13 shows a longitudinal section through the calotte-shell plate KK1, seen from the non-toothed guide edge.

Figure 14:
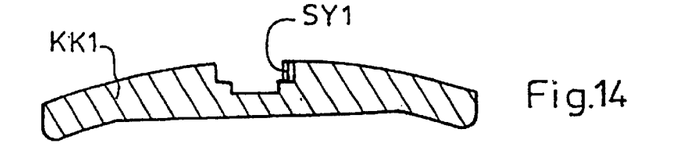
FIG. 14 shows the calotte shell in a cross-section.

FIG. 14 shows a cross-section through the calotte-shell plate KK1, with the toothing of the sector gear SY1 being visible on the one side of the notch.

Figure 15A:
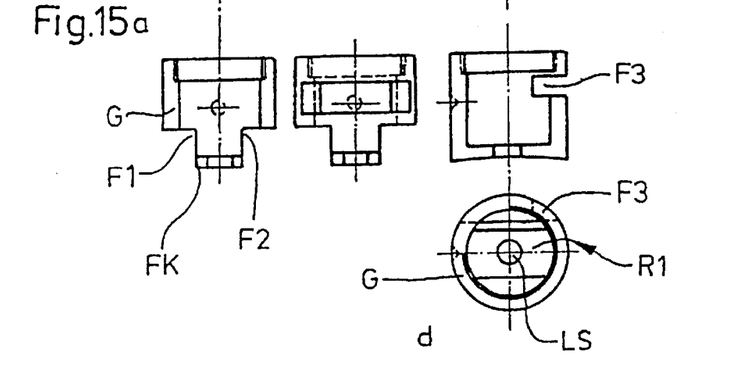
Figure 15B:
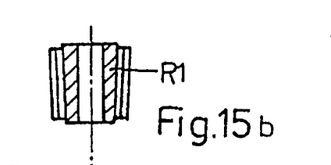
Figure 15C:
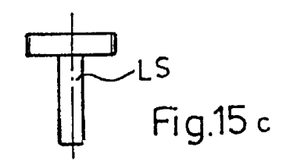

FIG. 15 shows, in a partial view a, the bearing house G for the angular wheel R1, and the wheel itself. The housing has at its lower side a guide runner FK, with two cutouts F1, F2 to the side of it, from which a partial region of the toothing of the angular wheel protrudes in the inserted state. The partial view b shows the housing from the opposite side, where a further cutout can be seen; in view c, which is rotated by 90°, this cutout is provided with the reference character F3. The angular wheel is seated in the housing with the bearing pin LS. The cover plate on the bearing pin provides further stability in the housing. The partial view d shows a further, detailed plan view of the entire angular-wheel holder arrangement. A central recess on the side of the housing serves to secure it against relative rotation following installation.

What is claimed is:

1. A pivoting device for pivoting a pivoting objective (O) disposed concentrically therein about two pivoting axes (Y, Z) that intersect at a right angle in an axis point of intersection (M) in the optical axis (X) of the pivoting objective, the pivoting objective (O) being held in an objective holder (OH), which is seated in bearings (L1, L2) so as to pivot in two degrees of freedom of a spherical surface, the bearings (L1, L2) being disposed on a stationary holding frame (HR), on which two pivoting-control elements (KY, KZ) are fixedly held, one of which is operatively connected to a meridian sector gear (SZ1, SZ2), while the other is operatively connected to an equatorial sector gear (SY1, SY2), of the objective holder (OH), the latter being disposed on the objective holder (OH) so as to be displaced in a meridian plane, characterized in that the meridian and equatorial sector gears (SZ1, SZ2; SY1, SY2) are guided by an anti-rotation mechanism (FK, FN), which secures them against relative rotation, on a circle, with respect to the holding frame, about the axis point of intersection (M), and the equatorial sector gear (SY1, SY2) can be pivoted in a pivot bearing (KK1, KK2) and displaceably seated in a guide (SA) on a meridian circle on the objective holder (OH) for an ecliptic pivoting compensation.

2. The pivoting device according to claim 1, characterized in that the anti-rotation mechanism (FK, FN) comprises a guide runner (FK), which extends into a guide groove (FN) of the pivot bearing (KK1–KK4).

3. The pivoting device according to claim 1, characterized in that the pivot bearings (KK1–KK4) are respectively embodied as a calotte-shell plate or cap (KK1, KK2).

4. The pivoting device according to claim 1, characterized in that two equatorial sector gears (SY1, SY2) having associated angular wheels (R1, R2), and two meridian sector gears (SZ1, SZ2) having associated, further angular wheels (R3, R4) are mirror-symmetrical with respect to the axis center point (M), with the sector gears (SY1, SY2; SY3, SY4), which are located opposite one another on the pivoting objective holder (OH), cooperating in pairs and in the same direction to pivot the holder, and the angular wheels (R1–R4) respectively being seated on a bearing pin (LS) in a bearing housing (G) that is located in the holding frame (HR) and has lateral openings, and with the bearing housing (G) projecting with the guide runner (FK), with support and guidance, into the guide groove (FN), which is embodied in one of the associated calotte-shell plates (KK1–KK4), with the meridian sector gears (SZ1, SZ2) being embodied in one of the round calotte-shell plates (KK3, KK4) that are only pivotably seated in the objective holder (OH), and with the equatorial sector gears (SY1, SY2) being embodied in one of the round calotte-shell plates (KK1, KK2) that are seated to pivot and be displaced along a meridian in the guide (SA) embodied as a pivoting-compensation depression (SA) in the objective holder (OH) to attain an ecliptic pivoting compensation.

5. The pivoting device according to claim 1, characterized in that the sector gears (SY1, SY2; SZ1, SZ2) are driven by the angular wheels (R1–R4) whose axes and flanks are oriented with respect to the axis point of intersection (M), the angular wheels being rotatably seated in one of the bearings embodied as annular, hollow-sphere-segment bearing shells (L1, L2) and meshing, with a toothed partial region, with an adjusting-ring sector gear (SS1–SS4) of one of two adjusting rings (STY, STZ) that are coaxially seated to rotate in one of the bearing shells (L1, L2).

6. The pivoting device according to claim 1, characterized in that the two adjusting rings (STY, STZ) mesh, with a respective sector gear (ZSY, ZSZ) mounted thereto, with a setting gear (RY, RZ).

7. The pivoting device according to claim 6, characterized in that the setting gears (RY, RZ) are respectively operatively connected via an angular gear (WY, WZ) to an associated, scaled setting knob (KY, KZ).

8. The pivoting device according to claim 1, characterized in that the holding frame (HR) is an objective standard or a front frame of a camera, and the pivoting device is provided with light blockage.

9. The pivoting device according to claim 8, characterized in that a withdrawal bellows or a camera housing detachably adjoins the front frame or the objective standard in a light-proof manner.

10. The pivoting device according to claim 1, characterized in that the two pivoting angles of the pivoting objective (O) are at least ±15°.

11. The pivoting device according to claim 1, characterized in that the pivoting objective (O) is a replaceable objective.

12. The pivoting device according to claim 5, characterized in that the bearing shells (L1, L2), the adjusting rings (STY, STZ), the objective holder (OH) and/or the calotte-shell plates (KK1–KK4) comprise tempered GFRP or light-metal investment casting.

13. The pivoting device according to claim 10, characterized in that the pivoting control elements (KY, KZ) respectively have an overall reduction such that one rotation of the setting knob (KY, KZ) virtually corresponds to a pivoting of the objective holder (OH) by the maximum pivoting angle.

14. The pivoting device according to claim 1, characterized in that the adjusting rings (STY, STZ) are flat in the radial direction, and their adjusting-ring sector gears (SS1, SS2; SS3, SS4) are disposed on rim-gear segments (ZAY, ZAZ) that extend perpendicular thereto, and form an angular gear with their respective associated angular wheel (R1–R4).

15. The pivoting device according to claim 14, characterized in that the adjusting rings (STY, STZ) are seated to slide one on top of the other and be displaced in a circular path with rim-gear segments (ZAY, ZAZ) that are offset from one another on a circle in a radial, cylinder-section-shaped recess (A) of the bearing shell (L1) that is extended, in sectors, parallel to the axis.

16. The pivoting device according to claim 4, characterized in that a scale (SAS) that indicates a degree of axis drift is provided in the pivoting-compensation recess (SA).

* * * * *